(12) United States Patent
Hodson

(10) Patent No.: US 9,313,829 B2
(45) Date of Patent: Apr. 12, 2016

(54) HEATED ENTRAINED SULFUR REMOVAL ELEMENT

(71) Applicant: Principal Technology, Inc., Plano, TX (US)

(72) Inventor: Matthew S. Hodson, Fairview, TX (US)

(73) Assignee: Principal Technology, Inc., Plano, TX (US)

( * ) Notice: Subject to any disclaimer, the term of this patent is extended or adjusted under 35 U.S.C. 154(b) by 0 days.

(21) Appl. No.: 14/296,731

(22) Filed: Jun. 5, 2014

(65) Prior Publication Data

US 2014/0363350 A1 Dec. 11, 2014

Related U.S. Application Data

(60) Provisional application No. 61/832,181, filed on Jun. 7, 2013.

(51) Int. Cl.

| | | |
|---|---|---|
| *B01J 16/00* | (2006.01) |
| *H05B 3/44* | (2006.01) |
| *H05B 3/74* | (2006.01) |
| *F28F 1/00* | (2006.01) |
| *F28F 3/08* | (2006.01) |
| *F28F 3/12* | (2006.01) |
| *F28F 9/00* | (2006.01) |
| *F28F 9/007* | (2006.01) |
| *H05B 3/40* | (2006.01) |
| *H05B 3/42* | (2006.01) |
| *H05B 3/68* | (2006.01) |
| *H05B 3/70* | (2006.01) |
| *H05B 3/72* | (2006.01) |
| *F28F 3/00* | (2006.01) |

(52) U.S. Cl.
CPC .............. *H05B 3/44* (2013.01); *B01J 16/005* (2013.01); *F28F 1/00* (2013.01); *F28F 9/007* (2013.01)

(58) Field of Classification Search
CPC . B01J 16/00; B01J 16/005; H05B 3/40–3/44; H05B 3/68–3/74; F28F 1/00; F28F 9/00; F28F 9/001; F28F 9/007; F28F 9/0075; F28F 3/00; F28F 3/08; F28F 3/083; F28F 3/086; F28F 3/12
See application file for complete search history.

(56) References Cited

U.S. PATENT DOCUMENTS 3,815,672 A * 6/1974 Bullard ............... B21D 53/085
165/150
4,155,990 A * 5/1979 Kimura ............... C01B 17/0404
423/567.1

* cited by examiner

*Primary Examiner* — Natasha Young

(57) ABSTRACT

Aspects of this disclosure enhance elimination problems that freezing sulfur creates with gas-liquid parallel plate separators by integrally heating the parallel plate gas-liquid separator assembly. Through integral heating the duration of time that the separator apparatus remains above the freezing temperature of elemental sulfur is prolonged, thereby, allowing the opportunity for residual liquid sulfur to drain from the parallel plate assembly during upsets in unit operations and after a sulfur recovery unit shutdown event, thereby reducing or eliminating the operation and maintenance problems that may occur with existing separator designs.

20 Claims, 10 Drawing Sheets

HEATED ENTRAINED SULFUR REMOVAL ELEMENT

CROSS-REFERENCE TO RELATED APPLICATION

This application claims the benefit of U.S. Provisional Application Ser. No. 61/832,181, filed by Matthew S. Hodson, et al., on Jun. 7, 2013, entitled "Heated Entrained Sulfur Removal Element" incorporated herein by reference.

TECHNICAL FIELD OF THE INVENTION

The disclosure is directed to a heated entrained sulfur removal element.

BACKGROUND

Entrained liquid elemental sulfur is detrimental to the performance and recovery efficiency of sulfur recovery process units utilized in the petroleum refining, natural gas processing, and petrochemical industries. The nature of the sulfur liquid formed in the sulfur condensing equipment of a sulfur recovery unit creates small-entrained liquid sulfur droplets, fog, or mist. Liquid mist eliminating pads are sometimes used in sulfur recovery unit condensers to remove the referenced entrained liquid sulfur but these devices are susceptible to high pressure drop, fouling, and plugging.

Gas-liquid parallel plate or parallel vane separators can be used as an alternate to mist eliminating pads to recover these entrained particles of liquid sulfur and sulfur bearing compounds. Parallel plate separators are less susceptible to plugging than mist eliminating pads and have a lower pressure drop during normal operating conditions.

Because elemental sulfur freezes at the relatively high temperature of approximately 239° F. when compared to the normal outlet operating temperature of the sulfur condensing equipment of approximately 300-350° F., upsets in the sulfur recover unit operation or unplanned shutdowns can cause any residual liquid sulfur that remains on the gas-liquid parallel plate separators to freeze causing a blockage in the gas flow path which requires significant maintenance to correct.

SUMMARY

One embodiment of this disclosure provides a heated entrained sulfur removal element that comprises a support frame with opposing end plates. A thermally conductive plate is located between the opposing end plates and coupled to the support frame. At least one heating element extends through the thermally conductive plate and the opposing end plates. The heating element has connectors located on ends thereof configured to couple the ends of the heating element to a heating source.

In another embodiment, there is provided a sulfur recovery system (SRS). The SRS system comprises a sulfur recovery unit combustion and thermal reactor couplable to a sulfur gas fee line. A waste heat recovery unit is coupled to the sulfur recovery unit combustion and thermal reactor. A first sulfur condenser heat exchanger is coupled to the waste heat recovery unit and further is coupled to a first heating media supply and a first heating media return, and a process gas heater is coupled to a catalytic reactor. A second sulfur condenser heat exchanger is coupled to the catalytic reactor and to a second heating media and a second heating return and is further coupled to a sulfur tail gas unit. A heated entrained sulfur removal element (HESRE) is coupled to at least one of the first sulfur condenser heat exchanger or the second sulfur condenser heat exchanger. In this embodiment, the HESRE comprises a support frame with opposing end plates. A thermally conductive plate is located between the opposing end plates and coupled to the support frame. At least one heating element extends through the thermally conductive plate and the opposing end plates. The heating element has connectors located on ends thereof configured to couple the ends of the heating element to a heating source.

The foregoing has outlined some of the features provided by the embodiments of this disclosure. Those skilled in the art should appreciate that they can readily use the disclosed conception and the embodiments described herein as a basis for designing or modifying other structures for carrying out the same purposes of the present disclosure. Those skilled in the art should also realize that such equivalent constructions do not depart from the spirit and scope of this disclosure.

BRIEF DESCRIPTION OF THE DRAWINGS

For a more complete understanding of the present invention, reference is now made to the following descriptions taken in conjunction with the accompanying drawings, in which.

DETAILED DESCRIPTION

This disclosure provides a means of preventing freezing of elemental sulfur on the surfaces of gas-liquid parallel plate or parallel vane separators used to remove entrained liquid elemental sulfur droplets, fog, or mist formed in the sulfur condensing equipment or liquid sulfur storage equipment of a sulfur recovery unit.

In one embodiment, the parallel plate or parallel vane separator is installed in the process gas piping downstream or outlet plenum of a sulfur condensing heat exchanger which is an integral part of the sulfur recovery process unit. The separator assembly may also be installed in the piping or vessels used for storage of molten liquid sulfur.

The process of removing heat from the sulfur recovery unit process gasses causes condensation of elemental sulfur. The condensed elemental sulfur naturally forms small droplets in the form of entrained liquid, liquid sulfur mist, or sulfur fog. The parallel vane separator removes these entrained droplets, mist, or fog through a means of direct impingement of the entrained liquid on the plates of the parallel vane separator. Once contacted with the separator plates the sulfur liquid adheres to the plate surface where it coagulates to form droplets large enough to drain from the parallel vane separator under the forces of gravity.

Figure 1:
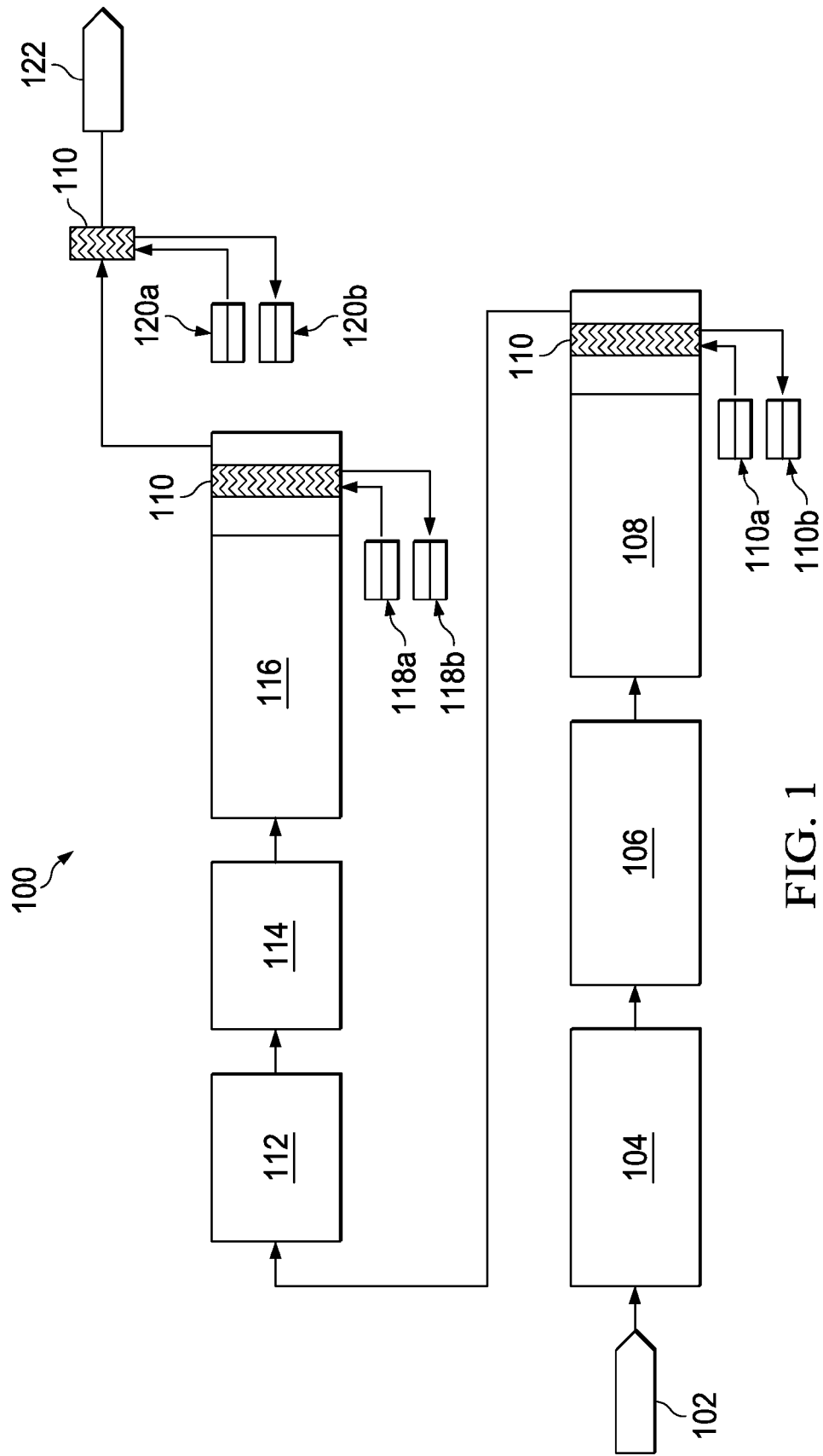
FIG. 1 illustrates a sulfur recovery system in which embodiments of the heated entrained sulfur removal element of this disclosure may be used.

FIG. 1 illustrates a sulfur recovery system (SRS) 100 in which embodiments of a heated entrained sulfur removal element (HESRE) of this disclosure may be used. Expect for the embodiments of the HESRE as covered by this disclosure, unless otherwise noted, the various components of the SRS 100 may be of conventional design. The SRS 100 receives a sulfur bearing gas feed from an upstream treating unit 102. The sulfur bearing gas then passes to and through a sulfur recovery unit combustion and thermal reactor 104, where the gas feed is partially combusted to form the sulfur compounds required to promote the reaction to form elemental sulfur. The heated gas feed then passes through a waste heat recovery boiler 106, where partially combusted gas is partially cooled to remove excess heat from the reaction products and traverses connective pipe line to a first sulfur condensing heat exchanger 108, where the gas feed is further cooled to below its dew point to form liquid elemental sulfur. The sulfur condensing heat exchangers 108 may include a heated entrained sulfur removal element (HESRE) 110, which in turn is connected to a heating media supply 110a and a heating media return 110b. The heating media may be any type of heating medium sufficient to transfer heat to the heating elements of the HESRE 110, such as heated liquid or an electrical current. The HESRE 110 is capable of providing heat to maintain liquid sulfur recovered from the sulfur-containing gas in a liquid state, and thereby, prevent it from freezing within the HESRE 110. Then, in one embodiment, the gas proceeds to a process gas heater 112, which may be a multiple pass unit or a single pass unit where the gas is reheated to a temperature sufficient to promote additional reaction of the sulfur bearing compounds to elemental sulfur in downstream catalytic reactors.

The gas then passes on to a catalytic reactor 114, which may also be a single or multiple pass unit where the gas is reacted to form additional elemental sulfur. In one embodiment, of the SRS 100, the gas then passes to another or second sulfur condensing heat exchanger 116, which may be a single pass or multiple pass unit, where the gas feed is cooled to below its dew point to form liquid elemental sulfur. As with the previous sulfur condensing heat exchanger unit 108, the sulfur condensing heat exchanger unit 116 may optionally include an HESRE 110, which is turn is connected to a heating media supply 118a and a heating media return 118b. The heating may be accomplished as noted above. The HESRE 110 is capable of providing heat to maintain liquid sulfur recovered from the sulfur-containing gas at this point in the SRS 100 to keep the sulfur in a liquid state, and thereby, prevent it from freezing within the HESRE 110.

In one alternative embodiment of the SRS 100, the heat exchanger 116 may be further coupled to another of the HESRE 110 at the outlet piping 122. In this embodiment the HERSU 110 includes a heating media supply 120a and heating media return 120b. Thus, as seen from the foregoing embodiments, the SRS 100 may include one or more of the HESREs 110 at various stages of the gas process flow.

Figure 2A:
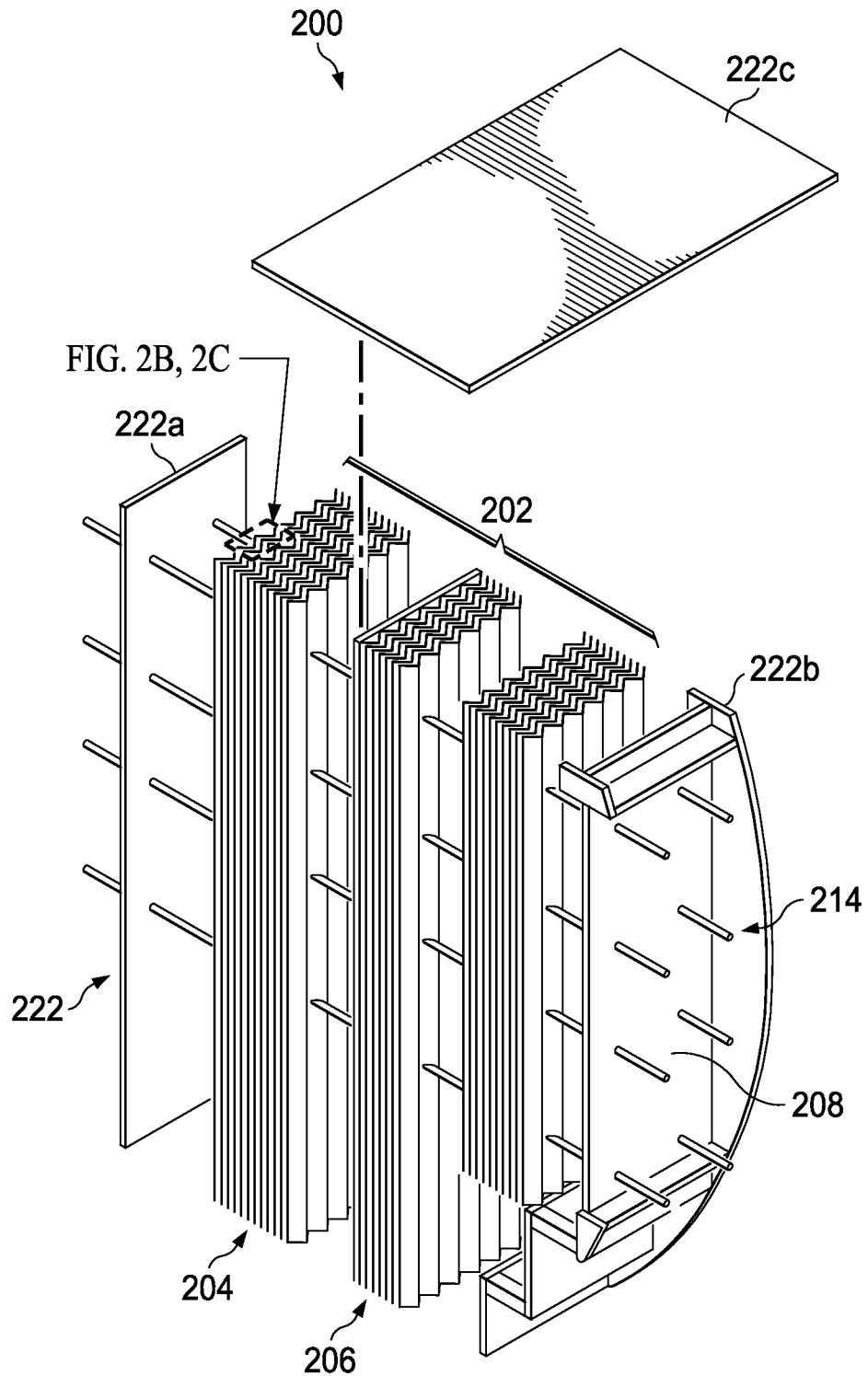
FIG. 2A illustrates an embodiment of the heated entrained sulfur removal element having one or more heating elements extending through the heating plates and one or more tie rods extending through the heating plates and end plates.

FIG. 2A illustrates one embodiment of a HESRE 200, as generally discussed above. In the embodiment of FIG. 2A, the HESRE 200 includes a group 202 of thermally conductive plate(s) 204 that may comprise one or more sub-groups 206. It should be understood that other embodiments may comprise only a single thermally conductive plate 204 or include multiples of groups 202 and sub-groups 206 of plates 204. In one embodiment, the thermally conductive plate(s) 204 may be conventional parallel plates or parallel vane separators, which may be constructed of metal or some other type of known, thermally conductive material that has good thermal conductivity sufficient provide transmission of heat from a heat source, such as heated fluid or an electrical current. The thermally conductive plate(s) 204, in one embodiment, may be a plurality of conventionally arranged vertical and parallel plates located at predetermined separations of distance along a direction perpendicular to the process gas flow to form one or more groups or sub-groups of vane assemblies.

The thermally conductive plate(s) 204 of the vane assembly are held together by one or more tie rods 208 or alternatives thereof, as discussed below. The horizontal spacing between the thermally conductive plate(s) 204 may be maintained by the use of spacers or direct attachment of the vertical plate(s) 204 to the tie rods 208 through a conventional weld 210 or through a conventional press fit through sheet metal tabs or protrusions 212 stamped in the parallel plate sheet metal during fabrication, as shown in FIG. 2B.

Figure 2B:
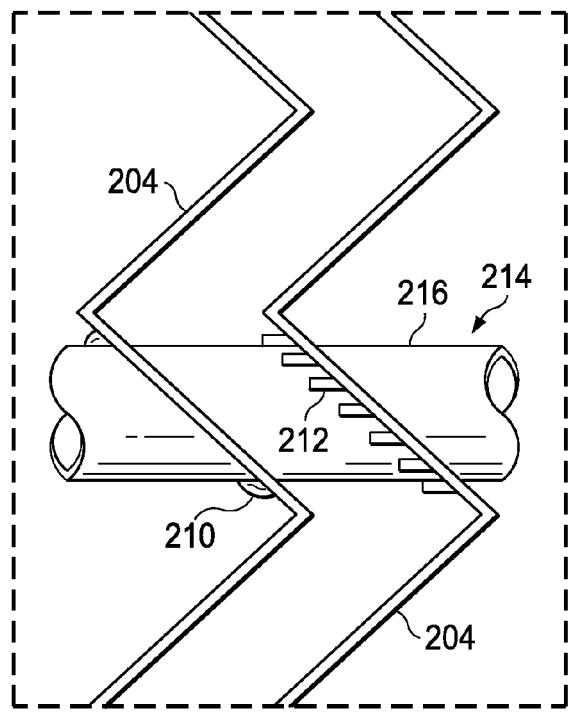
FIG. 2B illustrates another embodiment of the heating element configured as a hollow heating tube through which heating fluid may flow.
Figure 2C:
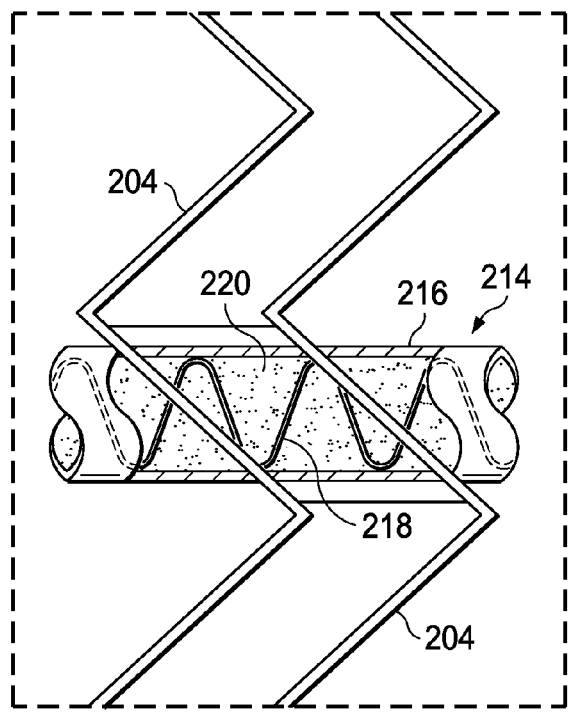
FIG. 2C illustrates another embodiment of the heating element configured as a hollow tube through which an electrical heating element located within the heating tube.

The HESRE 200 further includes one or more heating elements 214, as seen generally in FIGS. 2B and 2C, which may be comprised of steel, such as stainless steel. In one embodiment, the heating elements 214 may be a solid, conductive heating element, while in other embodiments, it may be a hollow tube. Additionally, the heating elements 214 in certain embodiments may also serve as the tie rods 208, so in some embodiments, the tie rods 208 and the heating elements 214 are the same component, while in other embodiments, they may be present as separate components with their separate, respective functions. In some embodiments, as illustrated in FIG. 2B, the heating element 214 may be hollow tube 216, which allows for the transmission of a heated liquid therethrough, or alternatively, as illustrated in FIG. 2C, the hollow tube 216 may serve as a conduit for an electrical conductive wire 218. In such embodiments, the wire 218 is surrounded by a thermally insulative material 220, such as magnesium dioxide, within the hollow tube 216.

The tie rods 208 may serve as the heating elements 214 to integrally heat the plates 204 through thermal conduction at the attachment points between the individual plate 204 and the tie rod 208. The heating element 214 has an appropriate fluid or electrical connector connected to the end of the tie rod 208 or heating element 214, such that it may be connected to the appropriate heating source. For example, where the heat is achieved through a heated liquid, the end of the tie rod 208 or heating element 214 has a fluid tight connector located on an intake end that may be cooperatively connected to a tube (not shown) by which the heated liquid is transmitted to the tie rod 208 or heating element 214. Alternatively, where the heating source is an electrical current, the tie rod 208 or heating element 214 has an electrical connector located on an end to which an electrical wire may be connected.

The tie rod 208 or the heating element 214 are not necessarily of solid construction, but in one embodiment, is constructed of a hollow conduit, tubing, or piping, as seen in FIGS. 2B and 2C, to carry the heating medium, such as condensing steam, hot water, heated glycol, hot oil, or other circulating fluids, or alternately electric resistive heating elements, required to enable thermal conduction heating of the plates 204.

Depending on the size and shape of the HERSE 200, multiple tie-rods 208 or heating elements 214 may be utilized for mechanical integrity and to provide adequate distribution of the heating media to establish even temperature distribution through the parallel plate or parallel HESRE 200, or vane separator assembly.

In one embodiment, the group(s) 202 of thermally conductive plate(s) 204, or vane assembly, may be installed in a metal support frame 222 to provide mechanical strength and ease of installation and removal of HESRE 200 assembly from a sulfur recovery condenser plenum, sulfur recovery unit process gas piping, or molten liquid sulfur storage equipment. In one configuration, the metal support frame 222 includes opposing end plates 222a, 222b, and an optional capping plate 222c.

Figure 3:
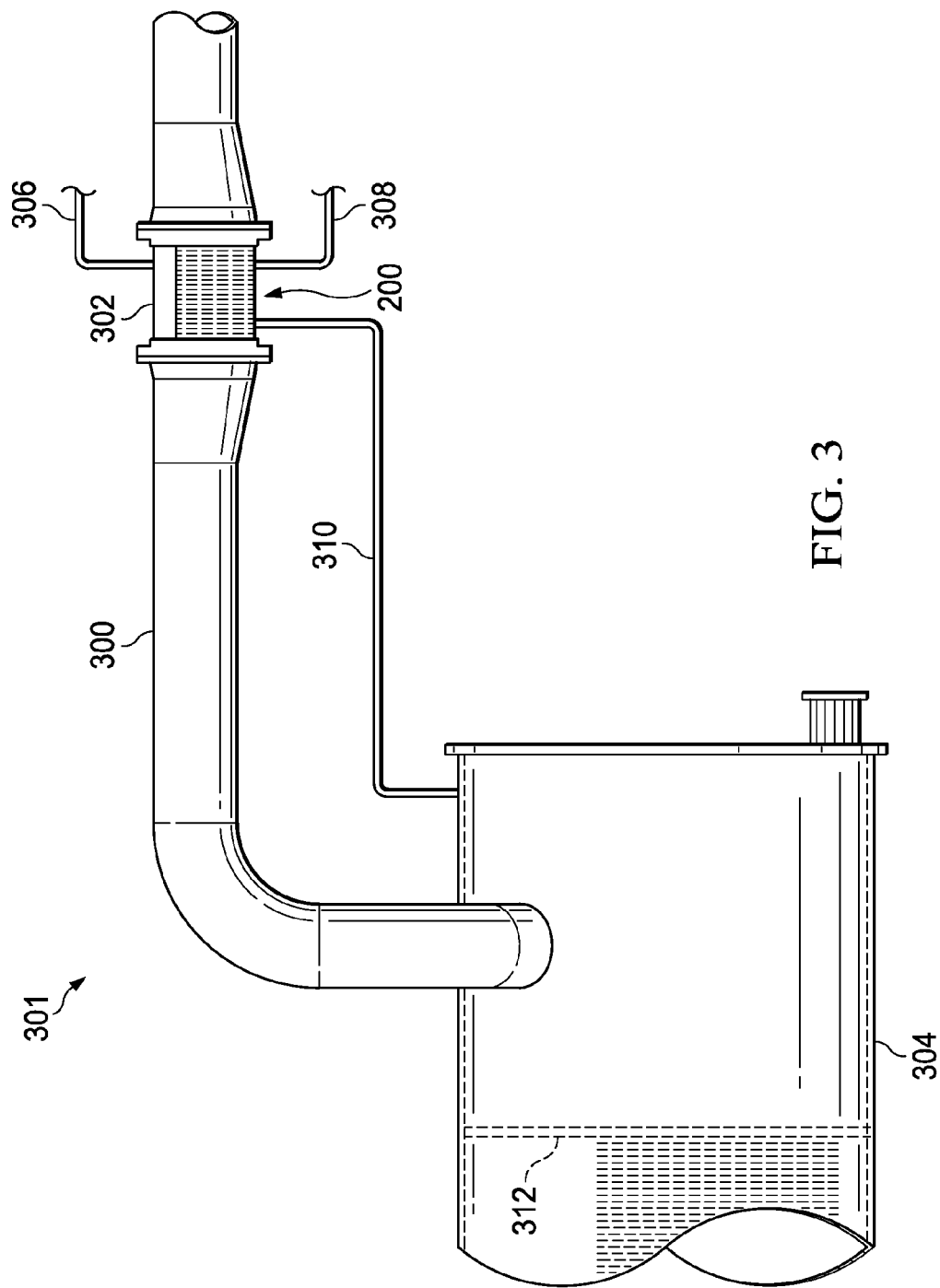
FIG. 3 illustrates one application of an embodiment of the heated entrained sulfur removal element as used in a sulfur condenser heat exchanger and an outlet piping section coupled to a downstream equipment of a sulfur recovery unit.

FIG. 3 illustrates an embodiment where the HESRE 200 is installed within the piping 300 of a sulfur condensing heat exchanger 301 as utilized in the SRS 100 and enclosed in a pressure containing housing 302 and attached in-line with the sulfur unit piping 300. In this embodiment, the HESRE 200 is located downstream of a sulfur condenser heat exchanger outlet plenum 304, or alternatively, in the piping connecting any liquid sulfur containing equipment in the SRS 100. Fluid or electric heating media is supplied to the HESRE 200 through external conduits 306, 308. Entrained liquid elemental sulfur removed from process gas stream is collected and returned to the condenser, liquid sulfur storage equipment, or other suitable equipment located in the sulfur recovery unit through sulfur drain piping 310).

Figure 4A:
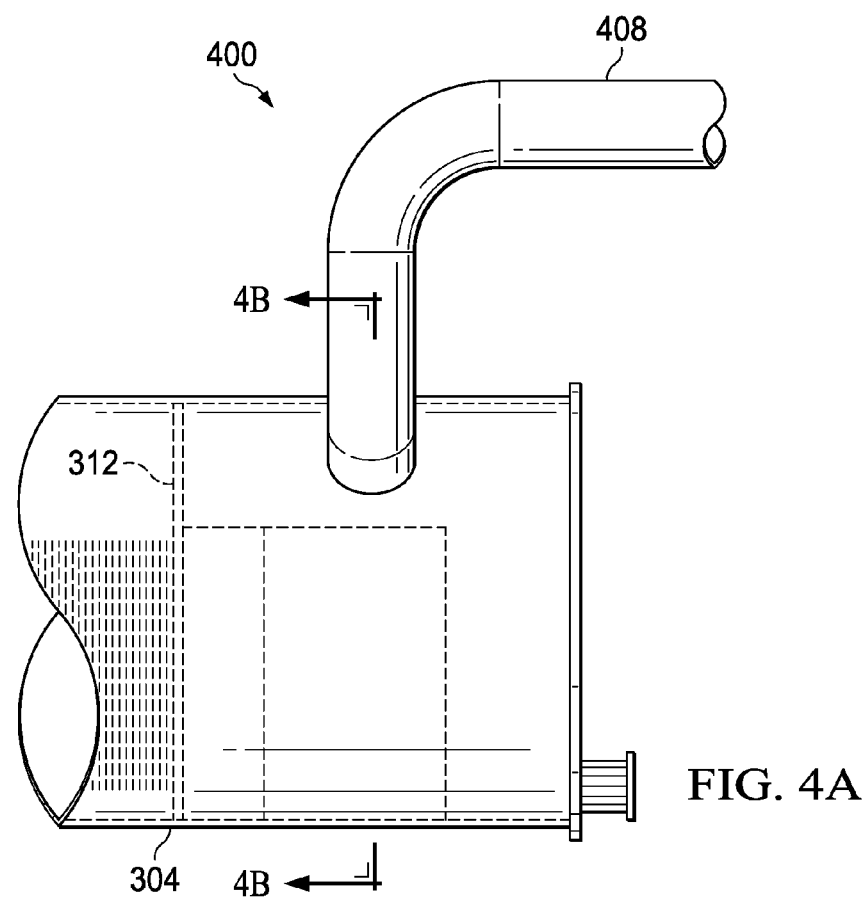
FIG. 4A illustrates one application of an embodiment of the heated entrained sulfur removal element as used in an outlet plenum of a sulfur condenser heat exchanger.
Figure 4B:
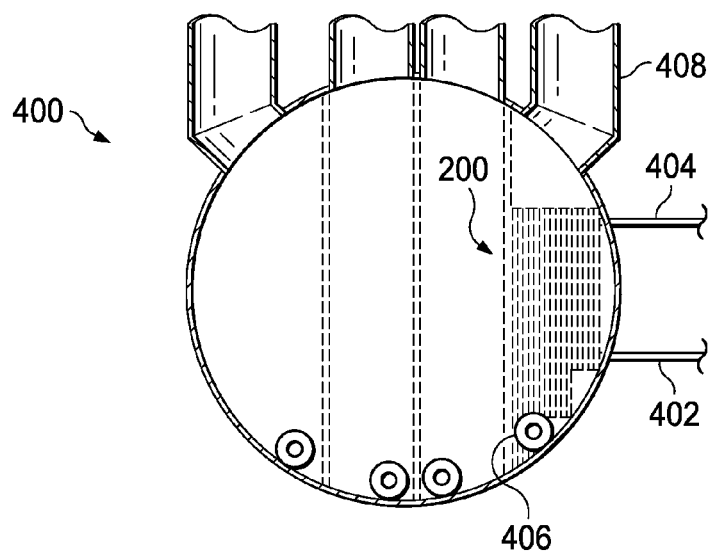
FIG. 4B illustrates a cross-sectional view taken through line 4B-4B of the embodiment of FIG. 4A showing the entrained sulfur removal unit having opposing end plates and tie rods located within a sulfur condensing heat exchanger.

FIGS. 4A and 4B illustrate the application of the HESRE 200 installed at the condenser outlet tube sheet 312 within a sulfur condensing heat exchanger 400. In this embodiment, the fluid or electric heating media is supplied to the heated parallel plate assembly through external conduits 402 and 404. Entrained liquid elemental sulfur removed from the process gas stream is collected and drained from the condenser outlet plenum 304 through liquid sulfur drain nozzles 406 that are located in the sulfur condensing heat exchanger 400 outlet plenum 304. After passing through the HESRE 200, process gases exit the condensing heat exchanger 400 through piping 408. As mentioned above, the HESRE 400 may be installed in a single pass or multiple pass sulfur condenser heat exchanger. The HESRE 200 may be located in the outlet plenum alone, or in addition, to the HESRE 200 attached in-line with the sulfur unit piping 300, as discussed with respect to the embodiment of FIG. 3.

Figure 5A:
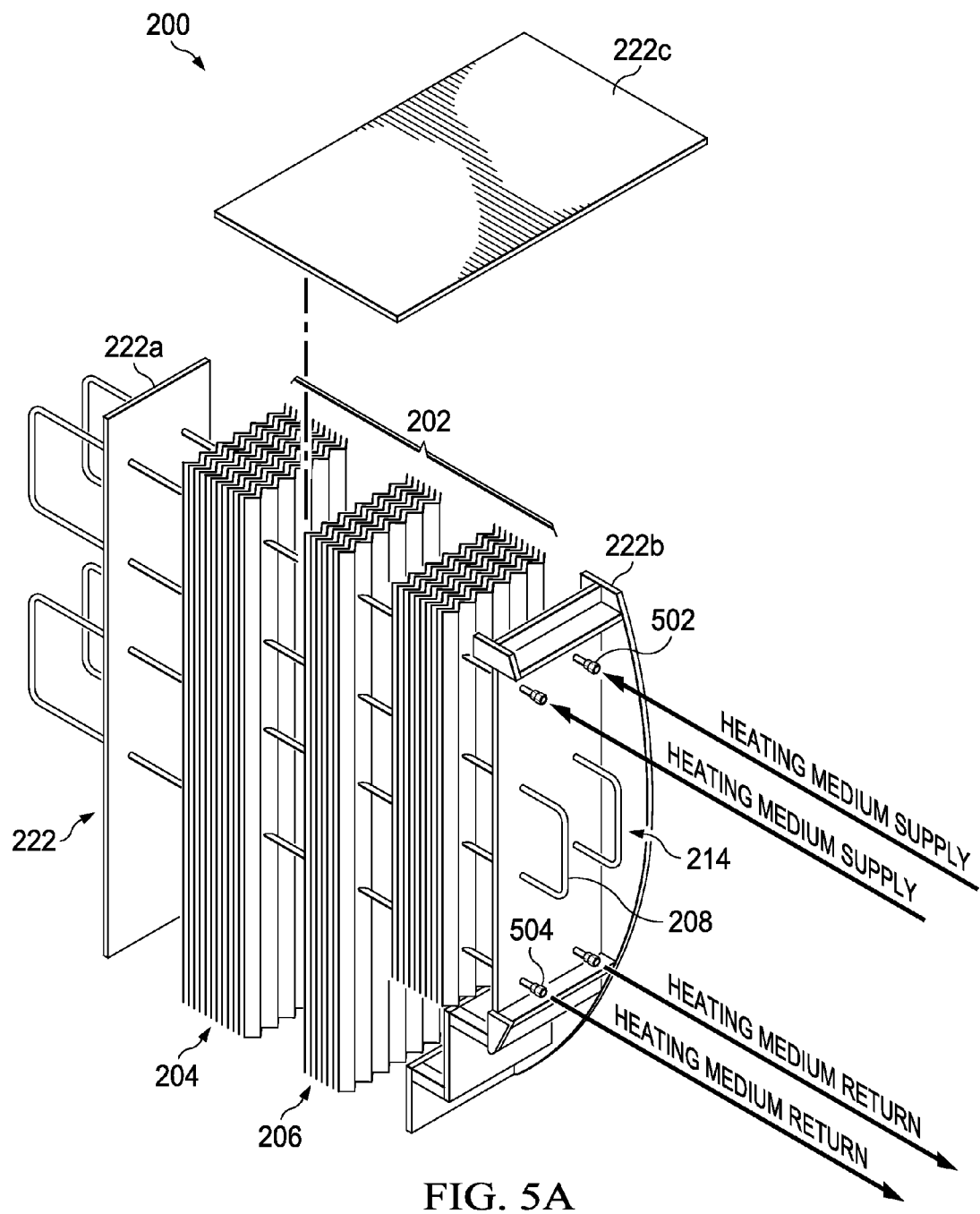
FIG. 5A illustrates one embodiment of the heated entrained sulfur removal element in which heating elements traverse the heated entrained sulfur removal element in a back and forth pattern.
Figure 5B:
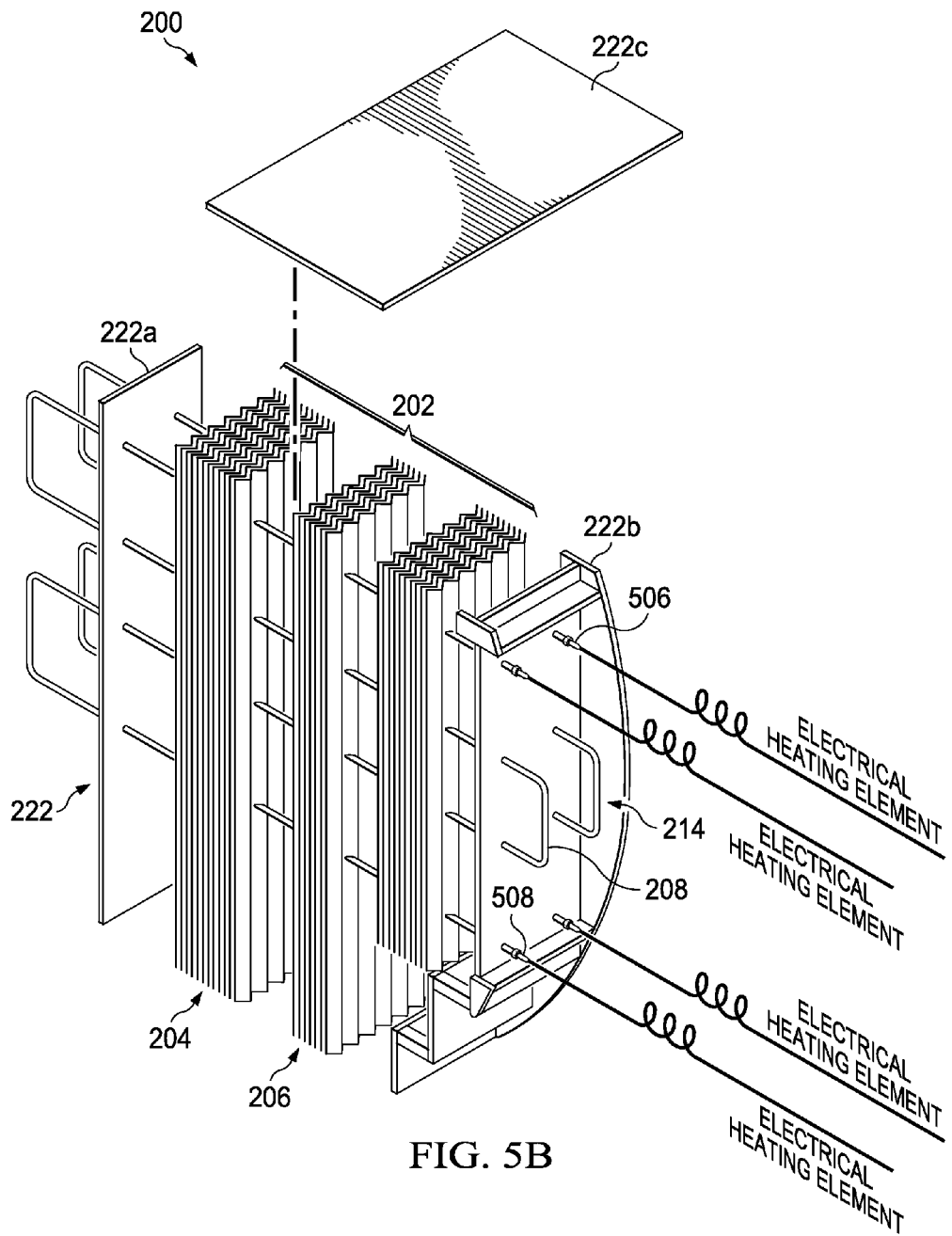
FIG. 5B illustrates an embodiment where the parallel plate or parallel vane separator construction is heated by an electric heating media.

FIGS. 5A and 5B illustrate embodiments of the HESRE 200 that has multiple individual heating elements 214, which may also serve as tie rods 208 and that have a serpentine configuration. In this embodiment, the heating elements 214 are hollow and are connected with a heating medium supply, as generally shown, by conventional liquid tight connectors 502 and 504. The conduit connectors 502, 504 may be located at either end of the tie-rods. The flow path of the fluid conduit and heating elements 214 are configured to establish a fluid flow circuit to distribute the fluid heating media throughout the HESRES 200. Multiple heating circuits can be included to provide additional heating capacity, as illustrated in FIG. 4 and alternately FIG. 4A.

FIG. 5B illustrates the HESRE 200 wherein the heating elements 214 are configured as heating elements. In one embodiment, the sheath of electric heating elements can be directly inserted into the heating elements 214, as generally shown, with conventional electrical connectors 506, 508 located in the opposing end plate 222b. Alternately, the plates 204 can be attached directly to the metal sheath of an electric heating element using the same means of attachment shown in FIG. 2B. The electric heating elements are connected to provide one or multiple electric circuits. The electric heater elements are interconnected to form a completed electrical circuit between the multiple rows of heating elements 214 with a connection wire protected in a suitable conduit, as discussed above regarding FIG. 2C. The distribution of the electrical heating elements and heating elements 214 are configured to establish a single or multiple parallel circuits to distribute heating throughout the HESRE 200.

The conduit for transporting the heating media to and from the HESRE 200, or alternately completing the electrical heating element circuit of the HESRE 200, is connected to the fluid or electrical distribution conduit, not shown, by way of the fluid connections 502, 504, or 506, 508, respectively. Any of these elements can be routed outside the sulfur condensing heat exchangers of FIG. 3 or FIGS. 4A and 4B, or a separator assembly housing installed in the SRS 100, or related molten liquid sulfur storage equipment through a pressure containing coupling or cable gland.

In certain embodiments, the construction of the heating elements 214, heating media fluid conduit or manifolds, or alternately electric resistance heating elements and associated wiring, are installed with expansion loops to provide adequate resistance to thermal expansion and to provide access to the unit for installation, maintenance, and removal.

Figure 6:
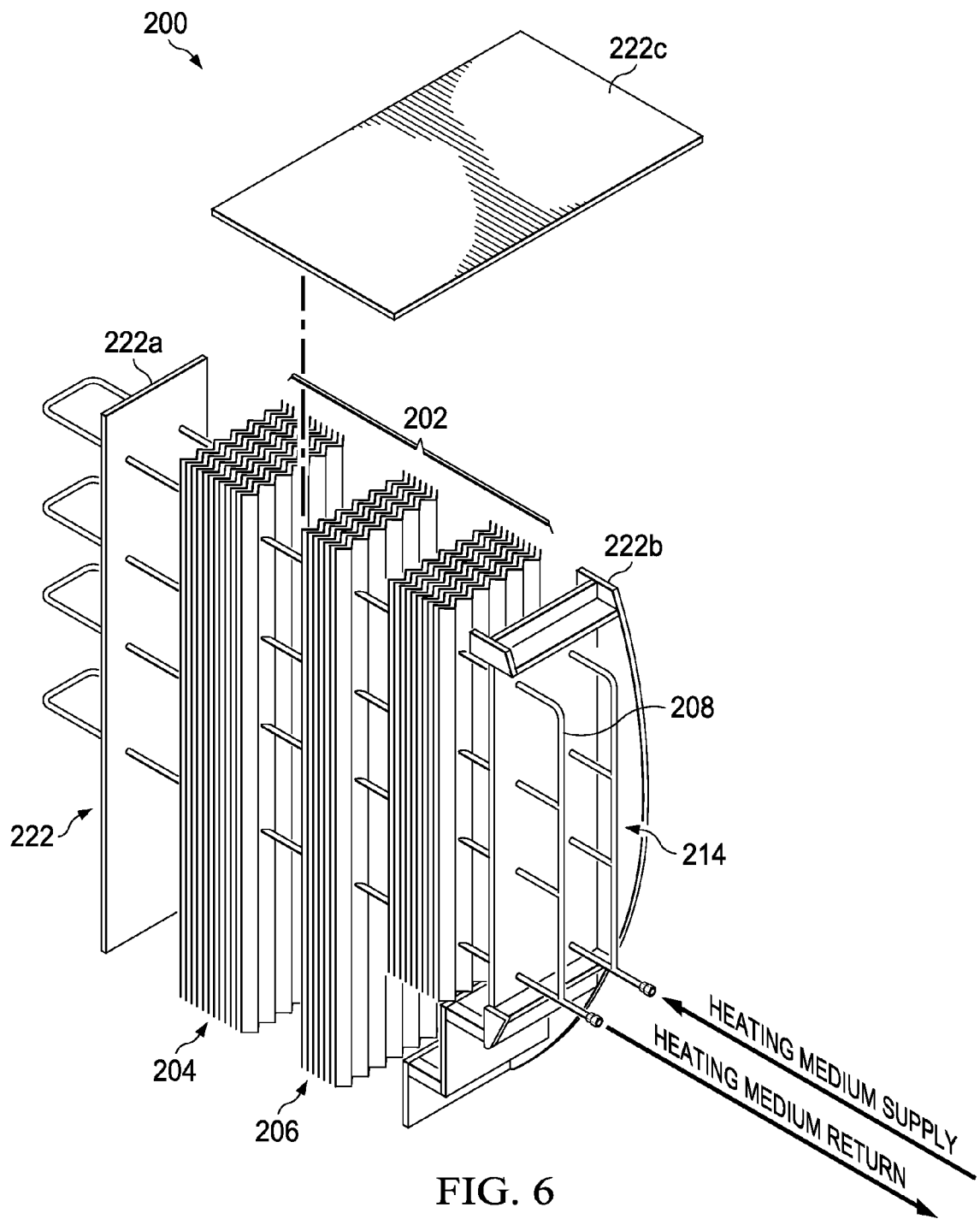
FIG. 6 illustrates another embodiment of the heated entrained sulfur removal element that includes parallel plate or parallel vane separator assembly construction for use with multiple fluid heating media flow circuits connected through a fluid distribution manifold.

FIG. 6 illustrates another embodiment of the HESRE 200 that includes a manifold configuration of the heating elements 214, which also may traverse the ERSE 200 in a back and forth configuration.

Figure 7A:
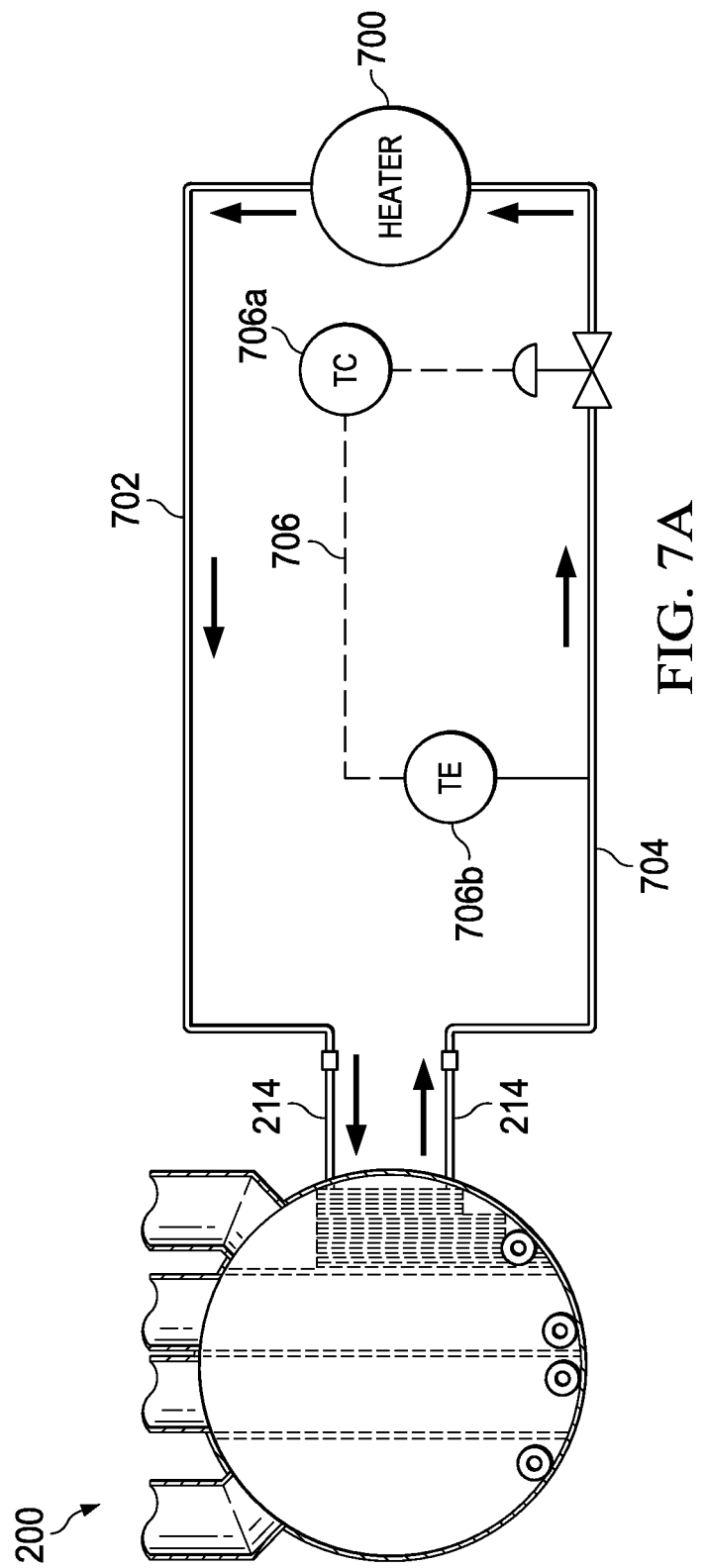
FIG. 7A illustrates one embodiment of a heated parallel plate separator assembly with a liquid heating medium control system block diagram.
Figure 7B:
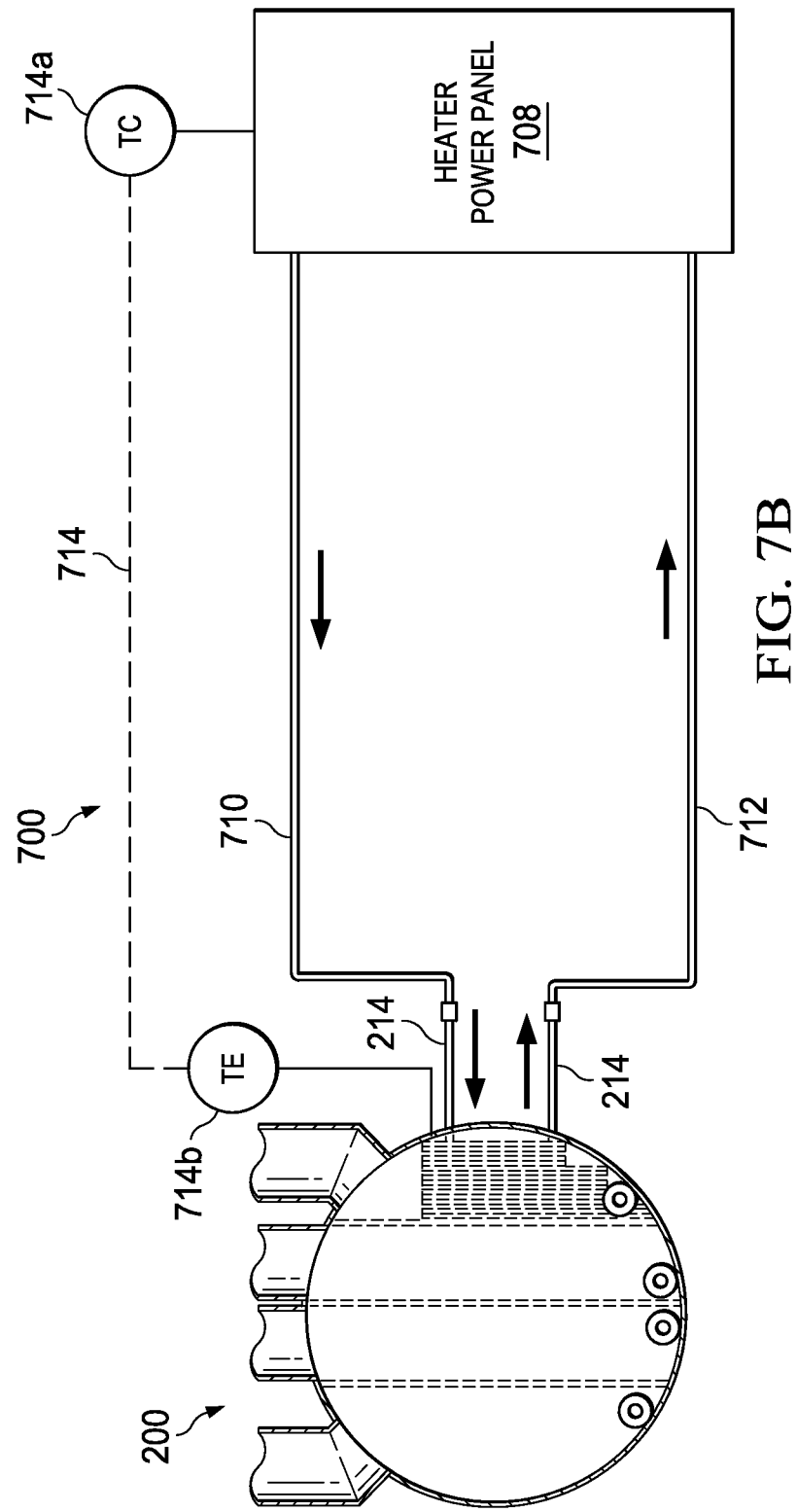
FIG. 7B illustrates one embodiment of a heated parallel plate separator assembly with an electric heating media control system block diagram.

FIGS. 7A and 7B illustrate schematic diagram of the HESRE 200 as described above in a configuration where the heating elements 214 are heated by a fluid medium (FIG. 7A) and in a configuration where the heating elements 214 are heated by electrical current (FIG. 7B). The complete system for a fluid heated parallel plate separator assembly includes various embodiments of the HESRE 200, as described above, that provides a means of supplying the heat and temperature that is required to prevent freezing of liquid elemental sulfur on the HESRE 200 assembly. In the embodiment where the heat source is a heated fluid medium, the HESRE 200 assembly includes a heater 700 and a supply conduit 702 and a return conduit 704 that connect to the heating elements 214, as described above. The heated fluid is controlled by a temperature control loop 706 that includes a temperature controller 706a and a temperature measuring element 706b.

In the embodiment where the heat source is electrical, the HESRE 200 assembly includes a power panel 708 and a first conduit 710 and a second conduit 712 that connect to the heating elements 214, as described above, to complete the electrical circuit. The current is controlled by a temperature control loop 714 that includes a temperature controller 714a and a temperature measuring element 714b. The temperature measuring element 714b can be mounted directly to the HESRE 200 to provide the feedback for the temperature control loop 714.

In one embodiment, these respective temperature control loops 706, 714 regulate the heat input to maintain the parallel plate element temperature between a minimum of approximately 239° F. to prevent freezing of elemental sulfur and not more than approximately 832° F. to prevent re-vaporization of the condensed and recovered elemental sulfur liquid. The temperature controller 706a and temperature sensing element 706b are not required if the fluid heating media is intrinsically maintained between the freezing and boiling temperature of elemental sulfur.

Although the present invention has been described in detail, those skilled in the art should understand that they can make various changes, substitutions and alterations herein without departing from the spirit and scope of the invention in its broadest form.

What is claimed is:

1. A heated entrained sulfur removal element, comprising:
    a support frame, comprising opposing end plates;
    a thermally conductive plate located between said opposing end plates and coupled to said support frame;
    at least one heating element that extends through said thermally conductive plate and said opposing end plates, said heating element having connectors located on ends thereof configured to couple said ends of said heating element to a heating source; and
    at least one tie rod that extends through said opposing end plates and said thermally conductive plate and binds said thermally conductive plate to said support frame.

2. The heated entrained sulfur removal element of claim 1, wherein said heating element traverses from one side of said heated entrained sulfur removal element to an opposing side of said heated entrained sulfur removal element.

3. The heated entrained sulfur removal element of claim 1, wherein said at least one tie rod extends from one side of said heated entrained sulfur removal element to an opposing side of said heated entrained sulfur removal element.

4. The heated entrained sulfur removal element of claim 1, wherein said heating element is a conductive heating element and is said at least one tie rod.

5. The heated entrained sulfur removal element of claim 1, wherein said thermally conductive plate is one of a group of spaced apart thermally conductive plates and said group comprises two or more sub-groups of spaced apart, thermally conductive plates.

6. The heated entrained sulfur removal element of claim 5, wherein said group of spaced apart, thermally conductive plates comprises a plurality of individual plates that are oriented parallel with respect to each other.

7. The heated entrained sulfur removal element of claim 1, wherein said heating element is a hollow tube and has an electrical heating wire extending therethrough and said heating source is an electrical source.

8. The heated entrained sulfur removal element of claim 7, wherein said hollow tube comprises steel and said electrical heating wire comprises a chromium wire and magnesium dioxide that extend through said hollow tube.

9. The heated entrained sulfur removal element of claim 1, wherein said heating element is hollow tube to allow for a heating fluid to pass therethrough and the heating source is a heated fluid.

10. A sulfur recovery system, comprising:
    a sulfur recovery unit combustion and thermal reactor connectable to a sulfur gas feed line;
    a waste heat recovery unit coupled to said sulfur recovery unit combustion and thermal reactor;
    a first sulfur condenser heat exchanger coupled to said waste heat recovery unit and further being coupled to a first heating media supply and a first heating media return and a process gas heater coupled to a catalytic reactor;
    a second sulfur condenser heat exchanger coupled to said catalytic reactor and to a second heating media and a second heating return and further being coupled to a sulfur tail gas unit;
    a heated entrained sulfur removal element coupled to at least one of said first sulfur condenser heat exchanger or said second sulfur condenser heat exchanger, comprising;
        a support frame, comprising opposing end plates;
        a thermally conductive plate located between said opposing end plates and coupled to said support frame; and
        at least one heating element that extends through said thermally conductive plate and said opposing end plates, said heating element having connectors located on ends thereof configured to couple said ends of said heating element to a heating source.

11. The sulfur recovery system of claim 10, wherein said heating element traverses from one side of said heated entrained sulfur removal element to an opposing side of said heated entrained sulfur removal element.

12. The sulfur recovery system of claim 10, further comprising at least one tie rod that extends through said opposing end plates and said group of spaced apart, thermally conductive plates and binds said thermally conductive plates together.

13. The sulfur recovery system of claim 12, wherein said at least one tie rod extends from one side of said heated entrained sulfur removal element to an opposing side of said heated entrained sulfur removal element.

14. The sulfur recovery system of claim 12, wherein said heating element is said at least one tie rod.

15. The sulfur recovery system of claim 10, wherein said thermally conductive plate is one of a group of spaced apart thermally conducive plates and said group comprises two or more sub-groups of spaced apart, thermally conductive plates.

16. The sulfur recovery system of claim 15, wherein said group of spaced apart, thermally conductive plates comprises a plurality of individual plates that are oriented parallel with respect to each other.

17. The sulfur recovery system of claim 10, wherein said heating element is a hollow tube that has an electrical heating wire extending therethrough and said heating source is an electrical source.

18. The sulfur recovery system of claim 17, wherein said hollow tube comprises steel and said electrical heating wire comprises a chromium wire and magnesium dioxide that extend through said hollow heating tube.

19. The sulfur recovery system of claim 10, wherein said heating source is a heated fluid.

20. The sulfur recovery system of claim 10, wherein a first of said at least one of said heated entrained sulfur removal elements is located within said first sulfur condenser heat exchanger, a second of said at least one of said heated entrained sulfur removal elements is located with said second sulfur condenser heat exchanger, said second sulfur condenser heat exchanger further being coupled to a third of said at least one of said heated entrained sulfur removal elements.

\* \* \* \* \*